(12) United States Patent
Lam et al.

(10) Patent No.: US 9,430,469 B2
(45) Date of Patent: Aug. 30, 2016

(54) METHODS AND SYSTEMS FOR RECURSIVELY GENERATING PIVOT TABLES

(71) Applicant: Google Inc., Mountain View, CA (US)

(72) Inventors: Allister Lam, Brighton, CO (US); Jeremy Adam Hinds, Thornton, CO (US); James Renwick, Louisville, CO (US); Garrett Cronin, Greenwich, CT (US); Rafael Darder Calvo, Rosario (AR); Fernando Gabriel Cervera, Rosario (AR)

(73) Assignee: Google Inc., Mountain View, CA (US)

( * ) Notice: Subject to any disclaimer, the term of this patent is extended or adjusted under 35 U.S.C. 154(b) by 330 days.

(21) Appl. No.: 14/248,718

(22) Filed: Apr. 9, 2014

(65) Prior Publication Data

US 2015/0370433 A1    Dec. 24, 2015

(51) Int. Cl.
*G06F 17/00* (2006.01)
*G06F 17/30* (2006.01)
*G06F 17/24* (2006.01)

(52) U.S. Cl.
CPC ............. *G06F 17/30* (2013.01); *G06F 17/246* (2013.01)

(58) Field of Classification Search
CPC .................................................... G06F 17/245
See application file for complete search history.

(56) References Cited

U.S. PATENT DOCUMENTS

| | | | | |
|---|---|---|---|---|
| 7,444,342 B1* | 10/2008 | Hall | ................... | G06F 17/30592 |
| 8,364,724 B2* | 1/2013 | Stolte | ................ | G06F 17/30554 707/805 |
| 8,402,361 B2* | 3/2013 | Goldberg | .............. | G06F 17/245 715/200 |
| 2002/0070953 A1* | 6/2002 | Barg | ...................... | G06Q 10/10 715/700 |
| 2008/0288889 A1* | 11/2008 | Hunt | ..................... | G06Q 30/02 715/810 |
| 2011/0055214 A1* | 3/2011 | Mui | .................. | G06F 17/30554 707/737 |
| 2011/0087708 A1* | 4/2011 | Teichmann | ............ | G06Q 10/10 707/803 |
| 2012/0278321 A1* | 11/2012 | Traub | ................ | G06F 17/30657 707/736 |
| 2014/0040806 A1* | 2/2014 | Anderson | .............. | G06Q 10/06 715/771 |
| 2014/0114970 A1* | 4/2014 | Prabu | ................ | G06F 17/30554 707/736 |
| 2014/0191900 A1* | 7/2014 | Uysal | .................. | G01S 13/9023 342/25 B |

OTHER PUBLICATIONS

Bime Go to Google BigQuery or Bime Website, 2 pgs, searched on Apr. 9, 2014, via online at http://bigquery.bimeanalytics.com/.
Excel 2007 Pivot Table Save Filters and Selections, 2 pgs searched on Apr. 9, 2014, via online at http://database.ittoolbox.com/groups/technical-functional/excel-l/excel-2007-pivot-table-save-filters-and-selections-4409765.

(Continued)

*Primary Examiner* — Laurie Ries
(74) *Attorney, Agent, or Firm* — Foley & Lardner LLP; John D. Lanza

(57) ABSTRACT

Systems and methods for recursively generating pivot tables are described. A processor provides, for display, a first table including a first set of results, each result including values corresponding to a first dimension. Each value of the first dimension is associated with a corresponding actionable object for further filtering a data set. In response to an action on an actionable object, the processor identifies a first set of entries of the plurality of entries that correspond to a value of the first dimension with which the actionable object is associated. The processor receives a second request to generate a second table from the first table identifying a second dimension. The processor generates the second table including a second set of results having values corresponding to the second dimension identified in the second request.

20 Claims, 20 Drawing Sheets

(56) References Cited

OTHER PUBLICATIONS

Jaspersoft the Intelligence Inside, 6 pgs, searched on Apr. 9, 2014, via online at https://www.jaspersoft.com/cloud-analytics.

Simba Technologies, 4 pgs, searched on Apr. 9, 2014, via online web at http://www.simba.com/data-terms-applications/excel-pivot-tables/what-would-google-do-part-n.

* cited by examiner

METHODS AND SYSTEMS FOR RECURSIVELY GENERATING PIVOT TABLES

BACKGROUND

Business intelligence involves the transformation of raw data into meaningful and useful information for business purposes. Using business intelligence tools, large amounts of unstructured or raw data can be processed to help, develop and otherwise create new opportunities. However, these business intelligence tools are not easy to use, and typically require companies to hire programmers to create software algorithms to generate reports.

SUMMARY

At least one aspect is directed to a method for recursively generating pivot tables. A processor receives a request to generate a first pivot table from a data set including a plurality of entries corresponding to a plurality of dimensions and a plurality of metrics. The request can identify a first dimension of the plurality of dimensions and at least one metric of the plurality of metrics. The request identifies a first dimension of the plurality of dimensions and at least one metric of the plurality of metrics. The processor generates the first table including a first set of results. Each result of the first set of results can include a first plurality of values corresponding to the first dimension and the at least one metric identified in the first request. The processor provides, for display on a user interface, the generated first table. Each value of the first dimension can be associated with a corresponding actionable object for further filtering the data set. The processor receives an action on at least one actionable object corresponding to a particular value of the first dimension. The processor identifies, from the first set of results, one or more results corresponding to the particular value of the first dimension. The processor receives a second request to generate a second pivot table from the first set of results of the first pivot table. The second request can be received in response to a dimension value of the first dimension being selected. The second request can also identify a second dimension of the plurality of dimensions and at least one metric of the plurality of metrics. The processor generates, from the first set of results, the second pivot table including a second set of results. Each result of the second set of results including a second plurality of dimension values corresponding to the second dimension and the at least one metric identified in the second request. The processor provides, for display on the user interface, the second pivot table. Each dimension value of the second dimension can be associated with a corresponding actionable object for further filtering the data set.

In some implementations, the processor can generate a database query responsive to receiving a request to generate the first pivot table. The processor can also modify the generated database query to include a filter instruction corresponding to the dimension value of the first dimension responsive to receiving the second request. In some implementations, the processor can provide the modified generated database query for display.

In some implementations, the processor can provide, for display on the user interface, a dimension value of the first dimension as an actionable object. In some implementations, the actionable object is actuated by a click. In some implementations, the processor can provide, for display, the first pivot table including a first plurality of cells including values of the first dimension and a second plurality of cells including values of the at least one metric. In some implementations, the first plurality of cells includes the actionable objects. In some implementations, responsive to an action on an actionable object corresponding to a dimension value of the first dimension, the processor can generate a filter identifying a first set of entries of the plurality of entries that correspond to a value of the first dimension with which the actionable object is associated.

Another aspect is directed to a system for recursively generating pivot tables. The system includes a data processing system having a pivot table generation module and a user interface module. The data processing system further includes a memory storing processor-executable instructions and a processor configured to execute the processor-executable instructions. A processor receives a request to generate a first pivot table from a data set including a plurality of entries corresponding to a plurality of dimensions and a plurality of metrics. The request can identify a first dimension of the plurality of dimensions and at least one metric of the plurality of metrics. The request identifies a first dimension of the plurality of dimensions and at least one metric of the plurality of metrics. The processor generates the first table including a first set of results. Each result of the first set of results can include a first plurality of values corresponding to the first dimension and the at least one metric identified in the first request. The processor provides, for display on a user interface, the generated first table. Each value of the first dimension can be associated with a corresponding actionable object for further filtering the data set. The processor receives an action on at least one actionable object corresponding to a particular value of the first dimension. The processor identifies, from the first set of results, one or more results corresponding to the particular value of the first dimension. The processor receives a second request to generate a second pivot table from the first set of results of the first pivot table. The second request can be received in response to a dimension value of the first dimension being selected. The second request can also identify a second dimension of the plurality of dimensions and at least one metric of the plurality of metrics. The processor generates, from the first set of results, the second pivot table including a second set of results. Each result of the second set of results including a second plurality of dimension values corresponding to the second dimension and the at least one metric identified in the second request. The processor provides, for display on the user interface, the second pivot table. Each dimension value of the second dimension can be associated with a corresponding actionable object for further filtering the data set.

In some implementations, the processor can generate a database query responsive to receiving a request to generate the first pivot table. The processor can also modify the generated database query to include a filter instruction corresponding to the dimension value of the first dimension responsive to receiving the second request. In some implementations, the processor can provide the modified generated database query for display.

In some implementations, the processor can provide, for display on the user interface, a dimension value of the first dimension as an actionable object. In some implementations, the actionable object is actuated by a click. In some implementations, the processor can provide, for display, the first pivot table including a first plurality of cells including values of the first dimension and a second plurality of cells including values of the at least one metric. In some implementations, the first plurality of cells includes the actionable objects. In some implementations, responsive to an action on an actionable object corresponding to a dimension value of the first dimension, the processor can generate a filter identifying a first set of entries of the plurality of entries that correspond to a value of the first dimension with which the actionable object is associated.

Another aspect is directed to a computer-readable medium having instructions to provide information via a computer network. The instructions include instructions that cause a processor to receive a request to generate a first pivot table from a data set including a plurality of entries corresponding to a plurality of dimensions and a plurality of metrics. The request can identify a first dimension of the plurality of dimensions and at least one metric of the plurality of metrics. The request identifies a first dimension of the plurality of dimensions and at least one metric of the plurality of metrics. The processor generates the first table including a first set of results. Each result of the first set of results can include a first plurality of values corresponding to the first dimension and the at least one metric identified in the first request. The processor provides, for display on a user interface, the generated first table. Each value of the first dimension can be associated with a corresponding actionable object for further filtering the data set. The processor receives an action on at least one actionable object corresponding to a particular value of the first dimension. The processor identifies, from the first set of results, one or more results corresponding to the particular value of the first dimension. The processor receives a second request to generate a second pivot table from the first set of results of the first pivot table. The second request can be received in response to a dimension value of the first dimension being selected. The second request can also identify a second dimension of the plurality of dimensions and at least one metric of the plurality of metrics. The processor generates, from the first set of results, the second pivot table including a second set of results. Each result of the second set of results including a second plurality of dimension values corresponding to the second dimension and the at least one metric identified in the second request. The processor provides, for display on the user interface, the second pivot table. Each dimension value of the second dimension can be associated with a corresponding actionable object for further filtering the data set.

In some implementations, the processor can generate a database query responsive to receiving a request to generate the first pivot table. The processor can also modify the generated database query to include a filter instruction corresponding to the dimension value of the first dimension responsive to receiving the second request. In some implementations, the processor can provide the modified generated database query for display.

In some implementations, the processor can provide, for display on the user interface, a dimension value of the first dimension as an actionable object. In some implementations, the actionable object is actuated by a click. In some implementations, the processor can provide, for display, the first pivot table including a first plurality of cells including values of the first dimension and a second plurality of cells including values of the at least one metric. In some implementations, the first plurality of cells includes the actionable objects. In some implementations, responsive to an action on an actionable object corresponding to a dimension value of the first dimension, the processor can generate a filter identifying a first set of entries of the plurality of entries that correspond to a value of the first dimension with which the actionable object is associated.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
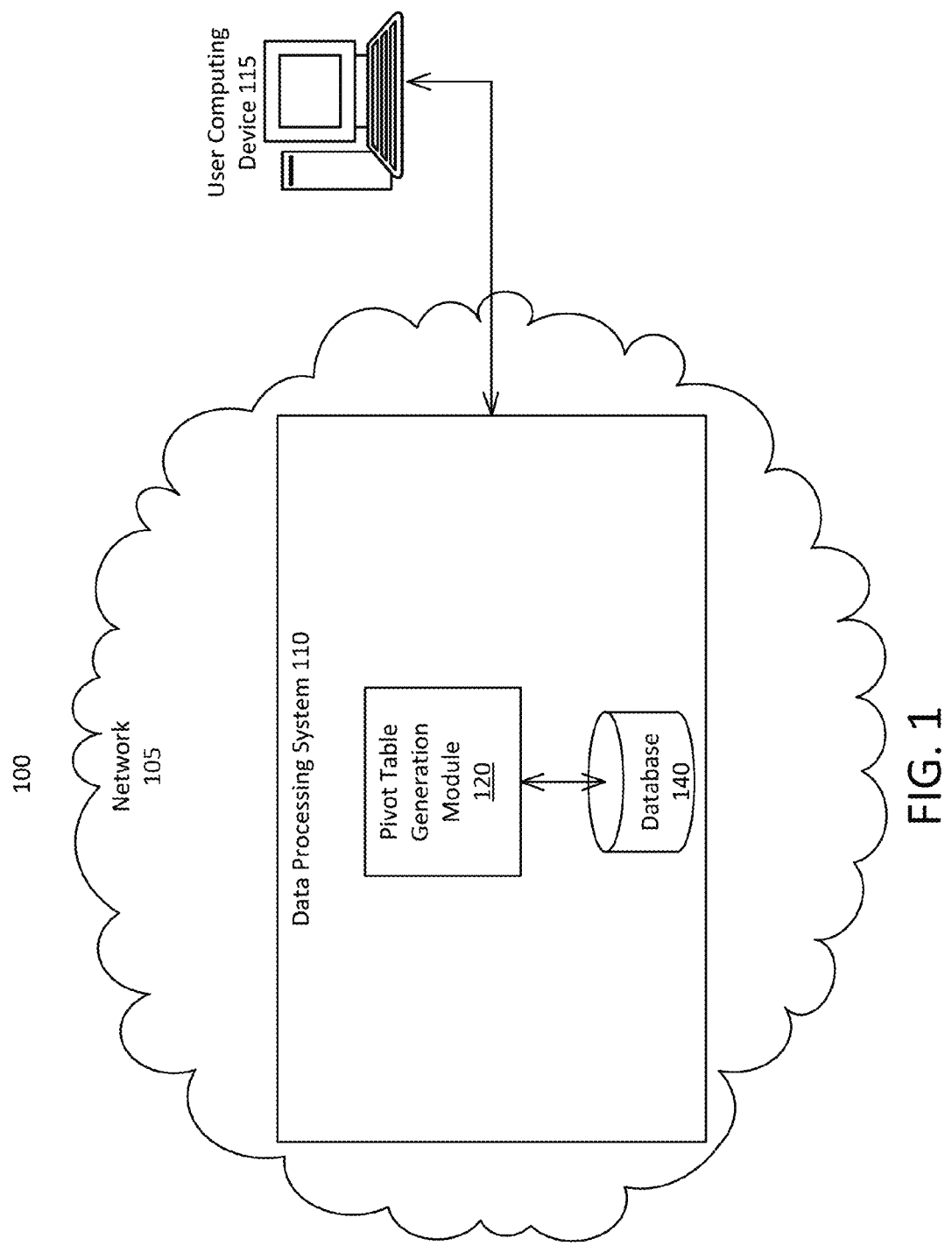
FIG. 1 is a block diagram depicting one implementation of an environment for recursively generating pivot tables, according to an illustrative implementation.

Following below are more detailed descriptions of various concepts related to, and implementations of methods, apparatus, and systems for recursively generating pivot tables. The various concepts introduced above and discussed in greater detail below may be implemented in any of numerous ways, as the described concepts are not limited to any particular manner of implementation. Examples of specific implementations and applications are provided primarily for illustrative purposes.

The present disclosure describes methods and systems for recursively generating pivot tables. A processor can identify, from a data source, a data set including a plurality of entries corresponding to a plurality of dimensions and a plurality of metrics. The processor can receive a request to generate a first table. The request can identify a first dimension of the plurality of dimensions and at least one metric of the plurality of metrics. The processor can generate the first table including a first set of results. Each result of the first set of results can include a first plurality of values corresponding to the first dimension and the at least one metric identified in the first request. The processor can provide, for display on a user interface, the generated first table. Each value of the first dimension can be associated with a corresponding actionable object for further filtering the data set. In response to an action on an actionable object, the processor can identify a first set of entries of the plurality of entries that correspond to a value of the first dimension with which the actionable object is associated. The processor can then receive a second request to generate a second table from the first table. The request can identify a second dimension of the plurality of dimensions and at least one metric of the plurality of metrics. The processor can then generate the second table including a second set of results. Each result of the second set of results includes a second plurality of values corresponding to the second dimension and the at least one metric identified in the second request. The processor can then provide, for display on a user interface, the second table. Each value of the second dimension is associated with a corresponding actionable object for further filtering the data set.

In some implementations, the data source from which one or more reports are generated can include a plurality of entries. The data source can be any structured data set that includes attributes. One example data source, which is used to generate some of the screenshots in the instant application, can include data relating to one or more advertisers participating in online advertising. Each entry includes a plurality of information that collectively, can allow the data set to be used to generate reports based on one or more dimensions or metrics. Each entry can include information relating to an advertisement provided for display, the advertiser associated the advertisement, the user computing device on which the advertisement was displayed, time, date and location information of when the advertisement was served, including other information.

In order for a user to effectively tap into the utility of the data, it is important for the user to be able to view the data in a variety of ways. The more ways a user is allowed to organize, filter, and view data, the better poised the user may be to find valuable insights into data. Using a report building tool as described in the instant application, a user may recursively generate pivot tables using one or more dimensions or one or more metrics from existing results of pivot tables.

The report building tool described herein provides a simple user interface through which a user having no or limited programming skills can generate one or more pivot tables. The user interface eliminates the need for the user to be able to have programming knowledge for generating complex scripts to query a database. Moreover, the user interface allows the user to recursively generate pivot tables in real-time.

FIG. 1 is a block diagram depicting one implementation of an environment for recursively generating pivot tables. In particular, FIG. 1 illustrates a system 100 for recursively generating pivot tables. The system 100 includes at least one data processing system 110. The data processing system 110 can include at least one processor and a memory, i.e., a processing circuit. The memory stores processor-executable instructions that, when executed by processor, cause the processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language such as, but not limited to, C, C++, C#, Java, JavaScript, Perl, Python and Visual Basic. The data processing system can include one or more computing devices or servers that can perform various functions. The data processing system 110 can include one or more processors or other logic devices such as a computing device having a processor to communicate via a network 105 with at least one user computing device 115. In some implementations, the user computing device 115 and the data processing system 110 can communicate with one another via the network 105.

The network 105 may be any form of computer network that relays information between the user computing device 115, data processing system 110, and one or more content sources, for example, web servers, advertising servers, amongst others. For example, the network 105 may include the Internet and/or other types of data networks, such as a local area network (LAN), a wide area network (WAN), a cellular network, satellite network, or other types of data networks. The network 105 may also include any number of computing devices (e.g., computer, servers, routers, network switches, etc.) that are configured to receive and/or transmit data within network 105. The network 105 may further include any number of hardwired and/or wireless connections. For example, the user computing device 115 may communicate wirelessly (e.g., via WiFi, cellular, radio, etc.) with a transceiver that is hardwired (e.g., via a fiber optic cable, a CAT5 cable, etc.) to other computing devices in network 105.

The user computing device 115 may be any number of different user electronic devices, for example, a laptop computer, a desktop computer, a tablet computer, a smartphone, a digital video recorder, a set-top box for a television, a video game console, or any other computing device configured to communicate via the network 105. The user computing device 115 can include a processor and a memory, i.e., a processing circuit. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language such as, but not limited to, C, C++, C#, Java, JavaScript, Perl, Python and Visual Basic.

The user computing device 115 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the user computing device 115 (e.g., a built-in display, microphone, etc.) or external to the housing of the user computing device 115 (e.g., a monitor connected to the user computing device 115, a speaker connected to the user computing device 115, etc.), according to various implementations. For example, the user computing device 115 may include an electronic display, which visually displays web pages using webpage data received from one or more content sources and/or from the data processing system 110 via the network 105. In some implementations, a content placement campaign manager or advertiser can communicate with the data processing system 110 via the user computing device 115. In other implementations, the advertiser can communicate with the data processing system 110 via a user interface displayed on the user interface devices of the user computing device 115. In still other implementations, the user computing device 115 can be configured to allow an advertiser to manage one or more ad campaigns by interacting with the data processing system 110. In yet other implementations, the advertiser can, via the user interface, view, manage and create one or more pivot tables generated from ad campaign related data that is stored and maintained by the data processing system 110.

The data processing system 110 can include at least one server. In some implementations, the data processing system 110 includes a pivot table generation module 120. In addition, the data processing system 110 can include one or more additional modules that can communicate with the pivot table generation module 120 to provide functionality for recursively generating pivot tables. The data processing system can also include one or more content repositories or databases 140.

The pivot table generation module 120 can be designed, constructed or configured to recursively generate pivot tables. The pivot table generation module 120 can be configured to identify a data set from which one or more pivot tables can be generated. The data set can include a plurality of entries. Each entry can include values corresponding to one or more dimensions. These values can be used to calculate one or more metrics. As such, the data set can include a plurality of entries corresponding to a plurality of dimensions and a plurality of metrics. The present disclosure utilizes a sample online advertising data set, which is based on a large number of advertisements provided for display.

In some implementations, the data set from which the pivot tables can be generated may be a data set formed by joining two or more data sets. This is referred to as flattening the data set. By flattening the data set, a larger number of dimensions can be used to generate pivot tables from existing pivot tables. In some implementations, the online advertising data sets can include entries corresponding to each advertisement provided for display on a user computing device, such as the user computing device 115. The online advertising data set can include dimensions corresponding to advertiser, type of ad, time of ad, date of ad, device type on which ad was served, type of action taken on ad, cost of ad, geography, amongst others. Metrics that can correspond to the online advertising data set can include click through rate, revenue, revenue per click, number of clicks, amongst others.

The pivot table generation module 120 can be configured to identify a data set from which pivot tables can be generated. In some implementations, the pivot table generation module 120 can identify the data set via a user interface provided for display through which a user can generate pivot tables. Screenshots of the user interface are shown in FIGS. 2A-2I and details of the screenshots will be described below. In some implementations, the pivot table generation module 120 may be configured to provide a user interface through which a user can interact with the pivot table generation module 120. In some implementations, the pivot table generation module 120 can be configured to identify the data set from a plurality of data sets stored on memory. In some implementations, the data sets can be stored locally on a user computing device on which the user interface is provided. In some implementations, the data sets can be stored on a cloud based application or remote server. In some implementations, the user interface can be provided for display on the user computing device as a cloud-based application or web application.

Figure 2A:
FIGS. 2A-2I are screenshots of various aspects of one implementation of a user interface through which pivot tables can be recursively generated.

The pivot table generation module 120 can be configured to receive a request to generate a pivot table. In some implementations, the pivot table generation module 120 can receive the request to generate the first table via the user interface provided for display on the user computing device. The request can identify one or more pivot table generation parameters. The pivot table generation parameters can include one or more dimensions, metrics or filters. In some implementations, the pivot table generation parameters can include a first dimension of the plurality of dimensions and at least one metric of the plurality of metrics. Referring briefly to FIG. 2A, a screenshot of a user interface 200 is depicted. The screenshot of the user interface 200 shows a dimensions bar 202, a metrics bar 210 and a filters bar 220. The dimensions bar 202 include an "Add Dimension" actionable item 204, through which one or more dimensions, such as dimension 206a (shown as "Advertiser" 206a) can be selected as a dimension. The metrics bar 210 includes an "Add Metric" actionable item 212, through which one or more metrics can be selected as metrics 214a-214c (shown as "Impressions" 214a, "Unique Impressions" 214b, "Clicks" 214c and "Unique Clicks" 214d). The filter bar is currently empty indicating that there are no filters in place and that the one or more data sets included in a network bar 280 can be used to generate a pivot table based on the dimension "Advertiser" 206a and the metrics "Impressions" 214a, "Unique Impressions" 214b, "Clicks" 214c and "Unique Clicks" 214d. The user interface 200a can further provide, for display, a time period filter 290 that can limit the data sets to entries corresponding to the selected time period. As shown in FIG. 2A, the time period filter 290 is set to "Yesterday." Upon selection of the "Run" actionable item 230, which is configured to send a signal to the pivot table generation module 120 to generate the pivot table based on one or more pivot table parameters, the pivot table generation module 120 can generate the pivot table 250.

The pivot table generation module 120 can be configured to generate the pivot table 250 including a first set of results 260a-260n. Each result of the first set of results 260a-260n can include a first plurality of values 262a-262n corresponding to the dimension "Advertiser" 206a. The pivot table generation module 120 can provide, for display on a user interface, the generated pivot table. Each value 262a-262n of the dimension 206a can be associated with a corresponding actionable object (shown as a dotted box) for further filtering the data set. In some implementations, the actionable objects can be positioned on or adjacent to the dimension values 262a-262n. In some implementations, the pivot table generation module 120 can position the actionable objects anywhere on the user interface 200a, such that when an action is taken on an actionable object corresponding to a particular value of the dimension 206a, the pivot table generation module 120 can select the particular value of the dimension as a filter.

As described above, the pivot table generation module 120 can be configured to generate one or more SQL instructions or SQL queries based on the request to generate the pivot table. The SQL query can be generated based on the pivot table parameters selected by the user via the user interface 200. In particular, the SQL query can be based on the selection of the dimensions 206a, metrics 214a-214c and one or more filters.

Figure 2B:
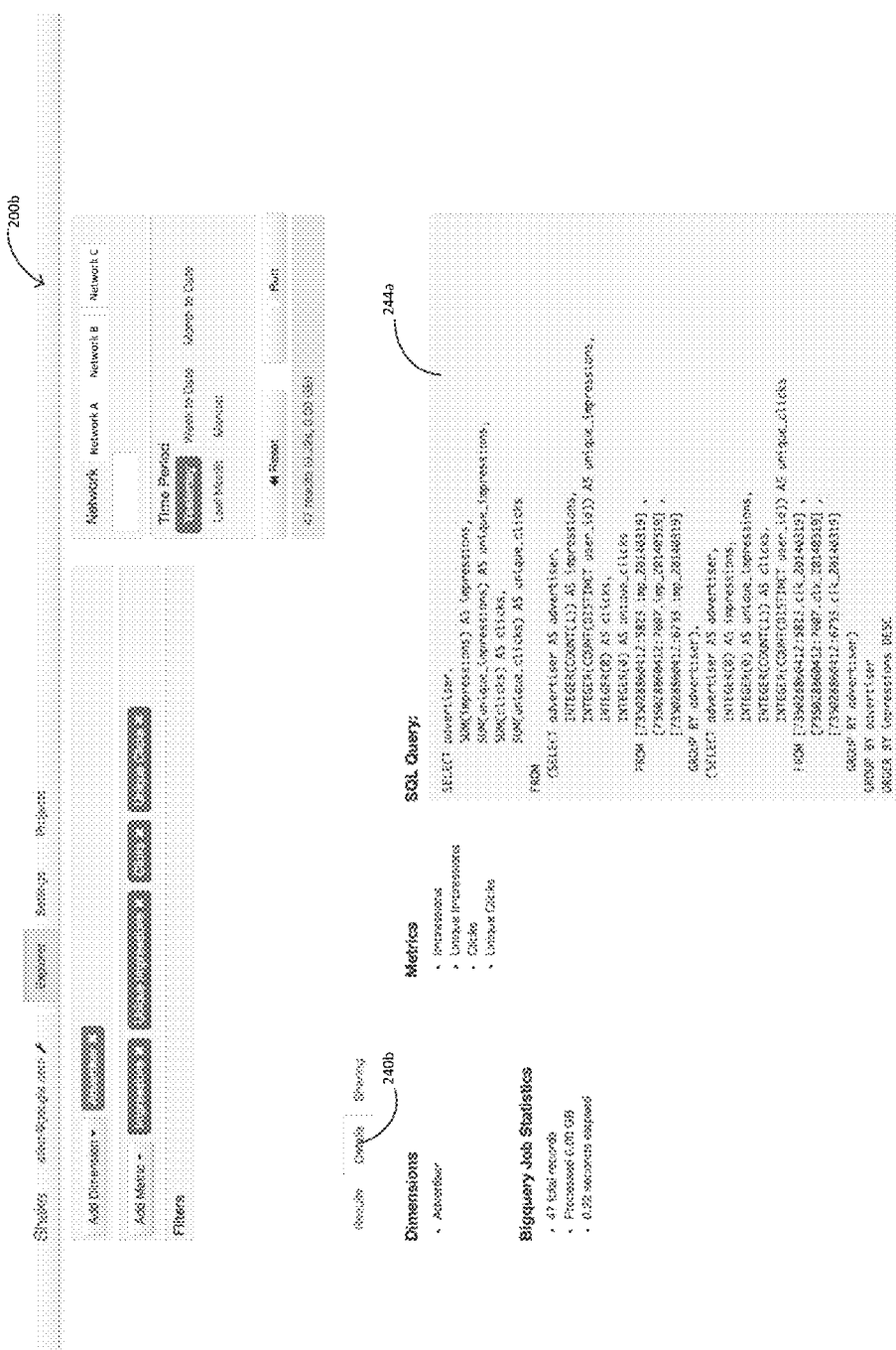

Referring now to FIG. 2B, a screenshot of the user interface 200b is shown. The screenshot 200b is generated upon actuating the "Details" actionable object 240b shown in the screenshot of the user interface 200a. The Details" actionable object 240b is configured to provide, for display, details of the pivot table generated in FIG. 2A. The user interface 200b also includes an SQL query 244a that corresponds to the pivot table parameters shown in FIG. 2A. The SQL query 244a can be copied by the user to make modifications. By providing the SQL query for display to the user, the user may be able to generate additional SQL queries without requiring significant database programming expertise.

The pivot table generation module 120 can be configured to include one or more filters to the pivot table parameters. The pivot table generation module 120 can include filters in response to detecting a qualifying action taken on one or more actionable objects. In some implementations, the qualifying action can be a click, tap, hover over on, around or adjacent to the actionable object, among others. The actionable object can be an icon, a link, or any visual object on which a qualifying action can be taken. In some implementations, the pivot table generation module 120 can be configured to include a particular dimension value displayed in the pivot table as a filter responsive to an action taken on an actionable object corresponding to the particular dimension value. For example, in the pivot table 250a shown in FIG. 2A, the pivot table generation module 120 may be configured to include the dimension values 'Advertiser 2', 'Advertiser 3' and 'Advertiser 5' in response to a user clicking on the actionable objects 262b, 262c and 262d that respectively correspond to 'Advertiser 2', 'Advertiser 3' and 'Advertiser 5.'

Figure 2C:
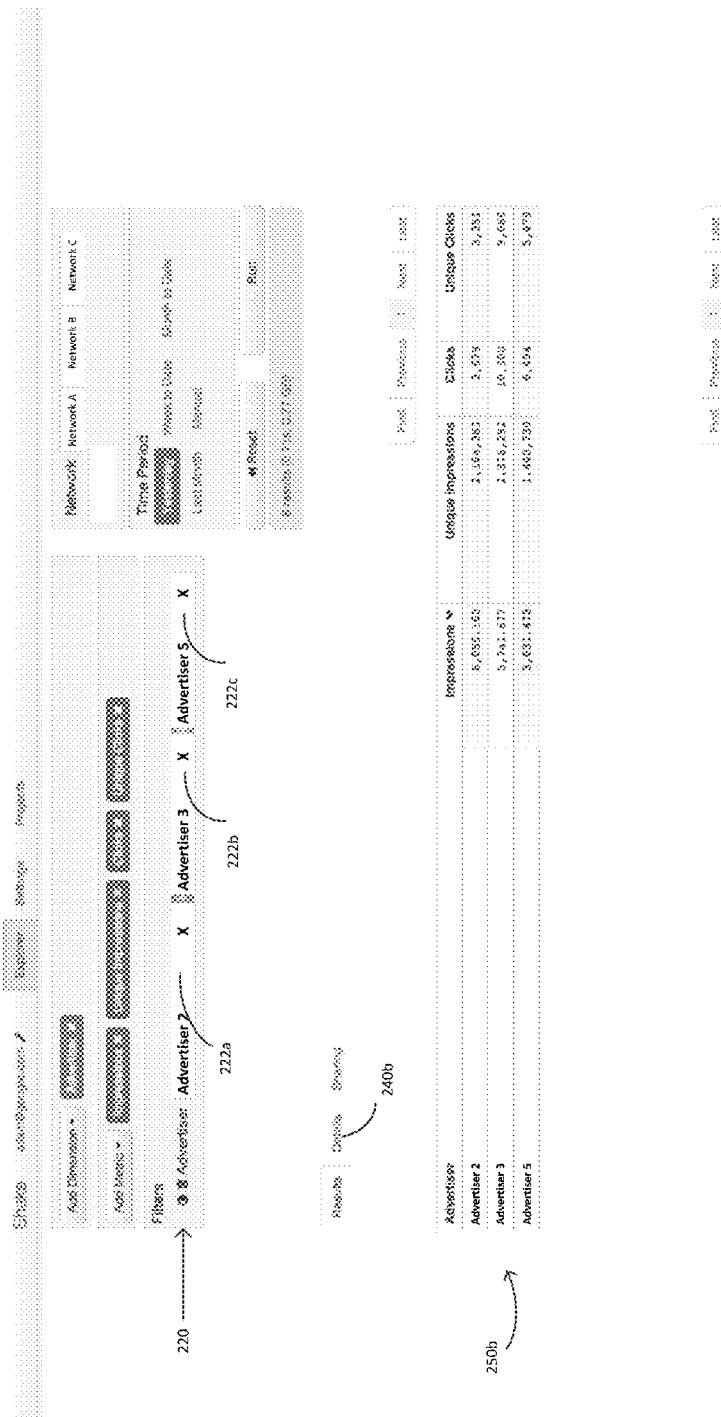

Referring to FIG. 2C, a screenshot of the user interface 200c is depicted. The user interface 200c shows the pivot table parameters including filters 222a-222c. As shown in FIG. 2C, the values 'Advertiser 2', 'Advertiser 3' and 'Advertiser 5' are selected as filters 222a, 222b and 222c, respectively in the filters bar 220. The values 'Advertiser 2', 'Advertiser 3' and 'Advertiser 5' can be selected as filters by a user of the user interface responsive to the user taking an action on the actionable objects 262b, 262c and 262d corresponding to the dimension values 'Advertiser 2', 'Advertiser 3' and 'Advertiser 5', respectively. For example, in some implementations in which the dimension values are actionable objects, the actions can be clicks on the values 'Advertiser 2', 'Advertiser 3' and 'Advertiser 5.' The pivot table generation module 120 can be configured to associate an actionable object with each of the dimension values 'Advertiser 2', 'Advertiser 3' and 'Advertiser 5.' By selecting the actionable object corresponding to the values "Advertiser 2', 'Advertiser 3' and 'Advertiser 5', the filters bar 220 of the pivot table parameters can be updated to include the filters 222a-222c corresponding to the dimension values 'Advertiser 2', 'Advertiser 3' and 'Advertiser 5.' Upon receiving a request to generate a pivot table based on the updated pivot table parameters, the pivot table generation module 120 can generate one or more SQL instructions based on the updated pivot table parameters to generate the pivot table 250b shown in FIG. 2C showing only three results corresponding to the dimension values 'Advertiser 2', 'Advertiser 3' and 'Advertiser 5.'

The generated pivot table 250b includes three results corresponding to the dimension values 'Advertiser 2', 'Advertiser 3' and 'Advertiser 5.' Each result includes a plurality of cells. Each cell includes a value corresponding to the dimension "Advertiser" and the metrics corresponding to the metrics "Impressions" 214a, "Unique Impressions" 214b, "Clicks" 214c and "Unique Clicks" 214d. As shown, the total number of impressions received by Advertiser 2 were 6,055,160, the number of unique impressions was 2,164,363, the total number of clicks was 3,679 and the number of unique clicks was 3,351. The pivot table generation module 120 can be configured to determine the total number of impressions, the number of unique impressions, the total number of clicks and the number of unique clicks using relevant data from entries in the data set that correspond to the dimension value "Advertiser 2" under the dimension "Advertiser." The SQL query corresponding to the pivot table 250d differs from the SQL query 244a shown in FIG. 2B in that the SQL instruction "WHERE (advertiser in (Advertiser 2, Advertiser 3, Advertiser 5)) is included, which corresponds to the dimension values 'Advertiser 2', 'Advertiser 3' and 'Advertiser 5' of the dimension "Advertiser" added as filters in the pivot table parameters.

The pivot table generation module 120 can be configured to update SQL queries in real-time responsive to actions taken by users via the user interface 200. In some implementations, the SQL queries can be updated responsive to the user submitting a request to generate a pivot table based on a particular set of pivot table parameters.

In response to an action on one or more actionable objects corresponding to one or more dimension values, the pivot table generation module 120 can identify a first set of entries of the plurality of entries that correspond to the dimension values with which the actionable objects are associated. The first set of entries can be identified by selecting only those entries in the data set that have dimension values that correspond to the dimension values with which the actionable objects are associated. For example, the pivot table generation module 120 can be configured to identify a first set of entries to include all entries corresponding to 'Advertiser 2', 'Advertiser 3' and 'Advertiser 5.'

The pivot table generation module 120 can be configured to receive additional requests to generate pivot tables from existing pivot tables. In some implementations, the pivot table generation module 120 can receive a second request to generate a second pivot table from a previously generated pivot table, such as the pivot table 250c, shown in FIG. 2D. The request can identify a second set of pivot table parameters. The second set of pivot table parameters can include a second dimension of the plurality of dimensions. In some implementations, the second set of pivot table parameters can also include at least one metric of the plurality of metrics. The pivot table generation module 120 can then generate the second pivot table including a second set of results. Each result of the second set of results can include a second plurality of dimension values corresponding to the second dimension identified in the second request. The pivot table generation module 120 can be configured to provide the second pivot table for display on the user interface. The pivot table generation module 120 can associate each dimension value of the second dimension with a corresponding actionable object for further filtering the data set.

Figure 2D:
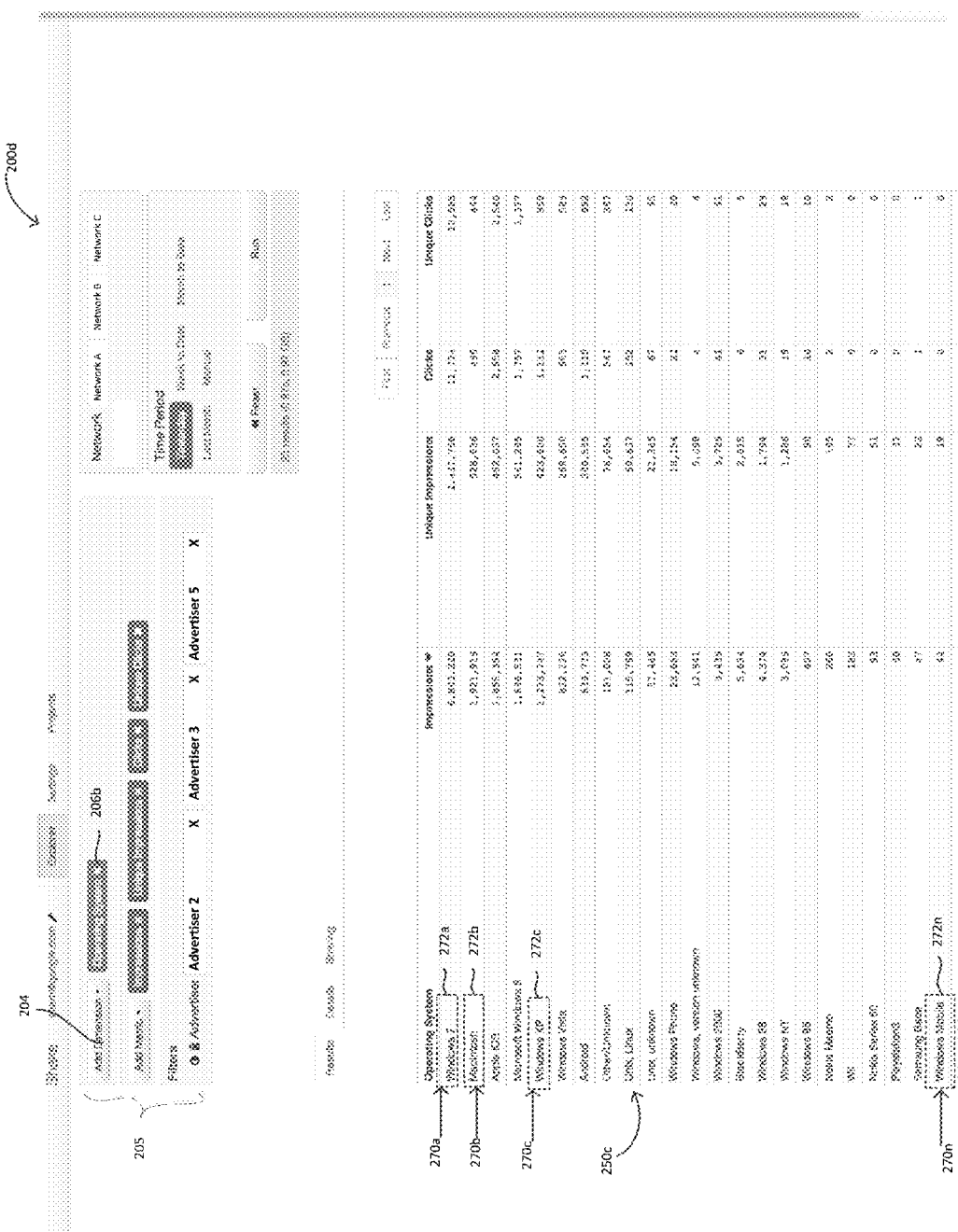

Referring now to FIG. 2D, a screenshot of the user interface 200d is shown. As shown in FIG. 2D, a pivot table 250c is provided for display. The pivot table 250c can be generated from the second pivot table 250b shown in FIG. 2C. The pivot table 250c is generated using the data set used for generating the first and second pivot tables 250a and 250b. The pivot table 250c is generated based on the pivot table parameters 205 shown in FIG. 2D. The pivot table parameters include the filters 'Advertiser 2', 'Advertiser 3' and 'Advertiser 5', the metrics "Impressions" 214a, "Unique Impressions" 214b, "Clicks" 214c and "Unique Clicks" 214d. Moreover, the pivot table parameters also includes a new dimension 'Operating System' 206b corresponding to the type of operating system associated with the computing devices on which the advertisements were provided for display.

The pivot table 250c includes a plurality of results 270a-270n, each corresponding to dimension values of the dimension 'Operating System.' The dimension values 272a-272n are associated with actionable objects (shown as dotted boxes), each of which can be configured to include a corresponding dimension value as a filter responsive to an action being taken on the particular actionable object. Each of the results 270a-270n includes a plurality of cells including values corresponding to the dimension 'Operating System' and the metrics "Impressions", "Unique Impressions", "Clicks" and "Unique Clicks." Each of the results can correspond to a plurality of entries in the data set. For instance, the result 270c can correspond to all entries in the data set that meet the following: the operating system was Windows XP and the advertisement corresponded to one of the advertisers 'Advertiser 2', 'Advertiser 3' and 'Advertiser 5.'

Figure 2E:
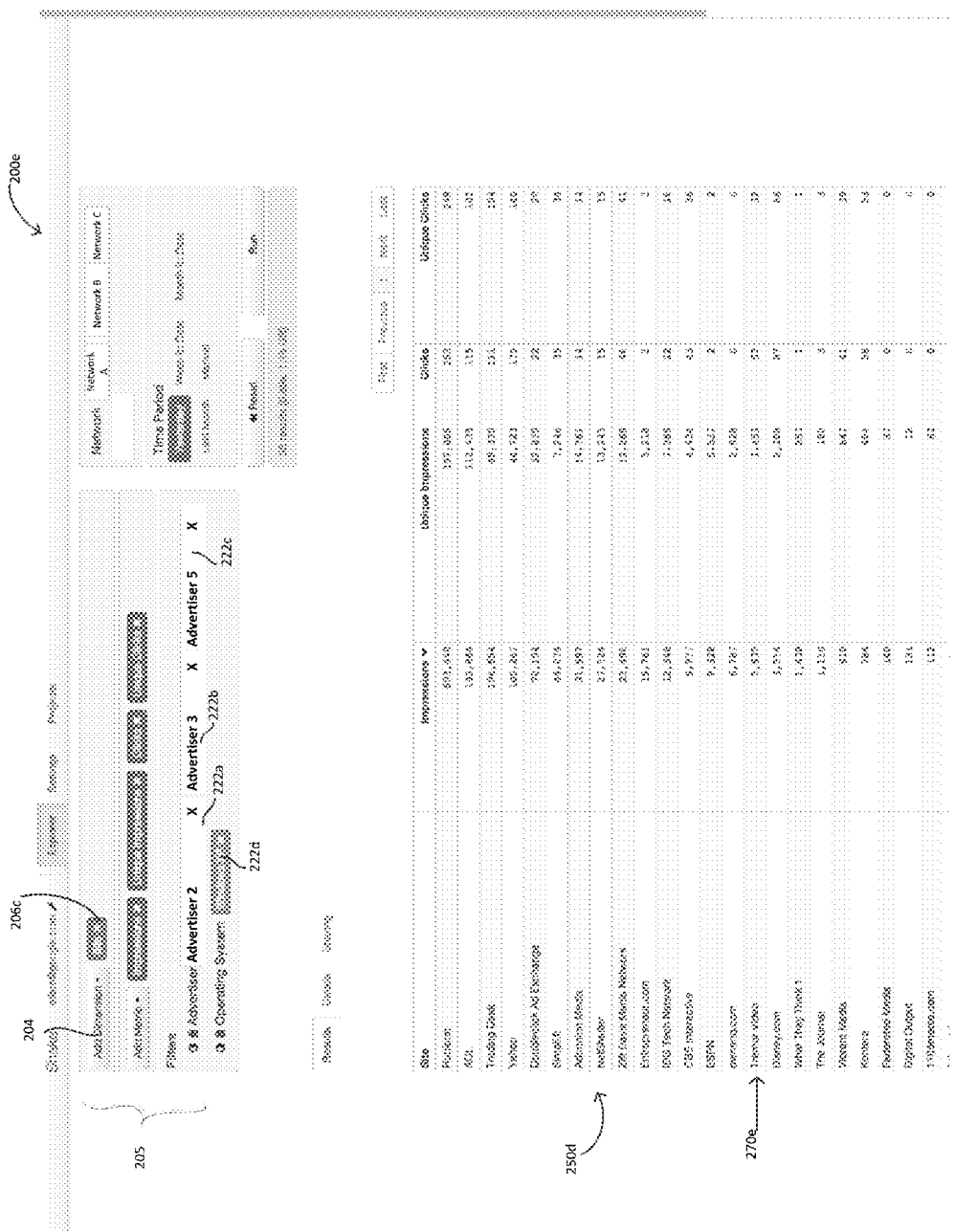

Referring now to FIG. 2E, a screenshot of the user interface 200e is shown. As shown in FIG. 2E, a pivot table 250d is provided for display. The pivot table 250d can be generated from the third pivot table 250c shown in FIG. 2D. The pivot table 250d is generated using the data set used for generating the first, second and third pivot tables 250a-250c. The pivot table 250d is generated based on the pivot table parameters 205 shown in FIG. 2E. The pivot table parameters include the filters 'Advertiser 2', 'Advertiser 3' and 'Advertiser 5' and the operating system 'Windows XP', the metrics "Impressions" 214a, "Unique Impressions" 214b, "Clicks" 214c and "Unique Clicks" 214d. Moreover, the pivot table parameters also includes a new dimension 'Site' 206c corresponding to the identity of the website on which the advertisements were provided for display.

The pivot table 250d includes a plurality of results, each corresponding to dimension values of the dimension 'Site.' The dimension values can again be associated with actionable objects, each of which can be configured to include a corresponding dimension value as a filter responsive to an action being taken on the particular actionable object. Each of the results includes a plurality of cells including values corresponding to the dimension 'Site' and the metrics "Impressions", "Unique Impressions", "Clicks" and "Unique Clicks." Each of the results can correspond to a plurality of entries in the data set. For instance, the result 270e can correspond to all entries in the data set that meet the following: the website on which the ad was displayed is 'Tremor Video', the operating system was 'Windows XP' and the advertisement corresponded to one of the advertisers 'Advertiser 2', 'Advertiser 3' and 'Advertiser 5.' Upon receiving an indication that the user has taken an action on an actionable object corresponding to the value 'Tremor Video,' the pivot table generation module 120 can set the value 'Tremor Video' as a filter, as shown in the screenshot shown in FIG. 2F.

Figure 2F:
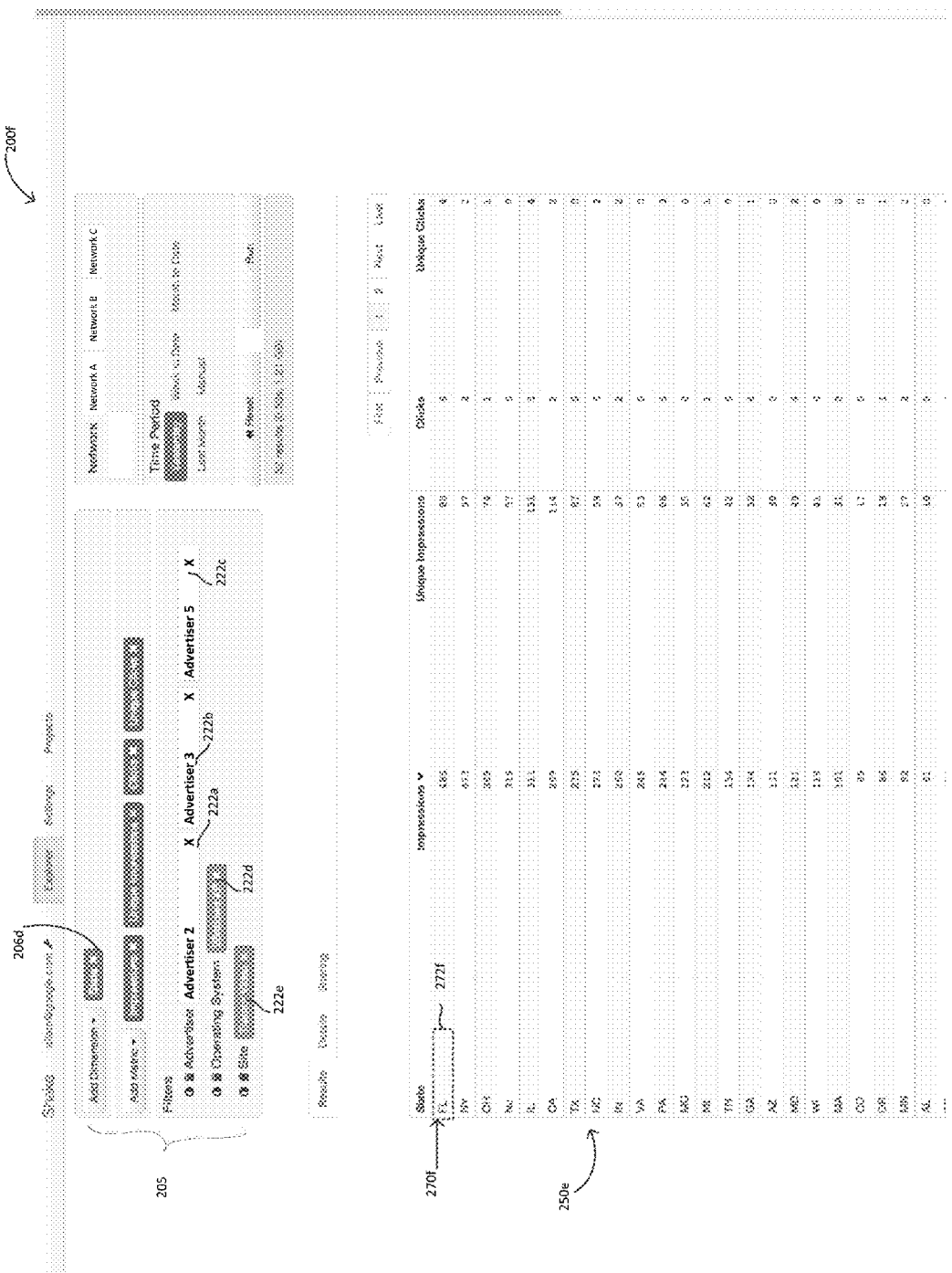

Referring now to FIG. 2F, a screenshot of the user interface 200f is shown. As shown in FIG. 2F, a pivot table 250e is provided for display. The pivot table 250e can be generated from the third pivot table 250d shown in FIG. 2E. The pivot table 250e is generated using the data set used for generating the first, second, third and fourth pivot tables 250a-250d. The pivot table 250e is generated based on the pivot table parameters 205 shown in FIG. 2F. The pivot table parameters include the filters 'Advertiser 2', 'Advertiser 3' and 'Advertiser 5', the operating system 'Windows XP' and the site 'Tremor Video', the metrics "Impressions" 214a, "Unique Impressions" 214b, "Clicks" 214c and "Unique Clicks" 214d. Moreover, the pivot table parameters also includes a new dimension 'State' 206d corresponding to the State in which the computing device on which the advertisement was provided for display is located.

The pivot table 250d includes a plurality of results, each corresponding to dimension values of the dimension 'State.' The dimension values can again be associated with actionable objects, each of which can be configured to include a corresponding dimension value as a filter responsive to an action being taken on the particular actionable object. Each of the results includes a plurality of cells including values corresponding to the dimension 'State and the metrics "Impressions", "Unique Impressions", "Clicks" and "Unique Clicks." Each of the results can correspond to a plurality of entries in the data set. For instance, the result 270f can correspond to all entries in the data set that meet the following: the State in which the computing device on which the advertisement was provided for display is located is Florida, the website on which the ad was displayed is 'Tremor Video', the operating system was 'Windows XP' and the advertisement corresponded to one of the advertisers 'Advertiser 2', 'Advertiser 3' and 'Advertiser 5.' Upon receiving an indication that the user has taken an action on an actionable object corresponding to the value 'Florida,' the pivot table generation module 120 can set the value 'Florida' as a filter, as shown in the screenshot shown in FIG. 2G.

Figure 2G:
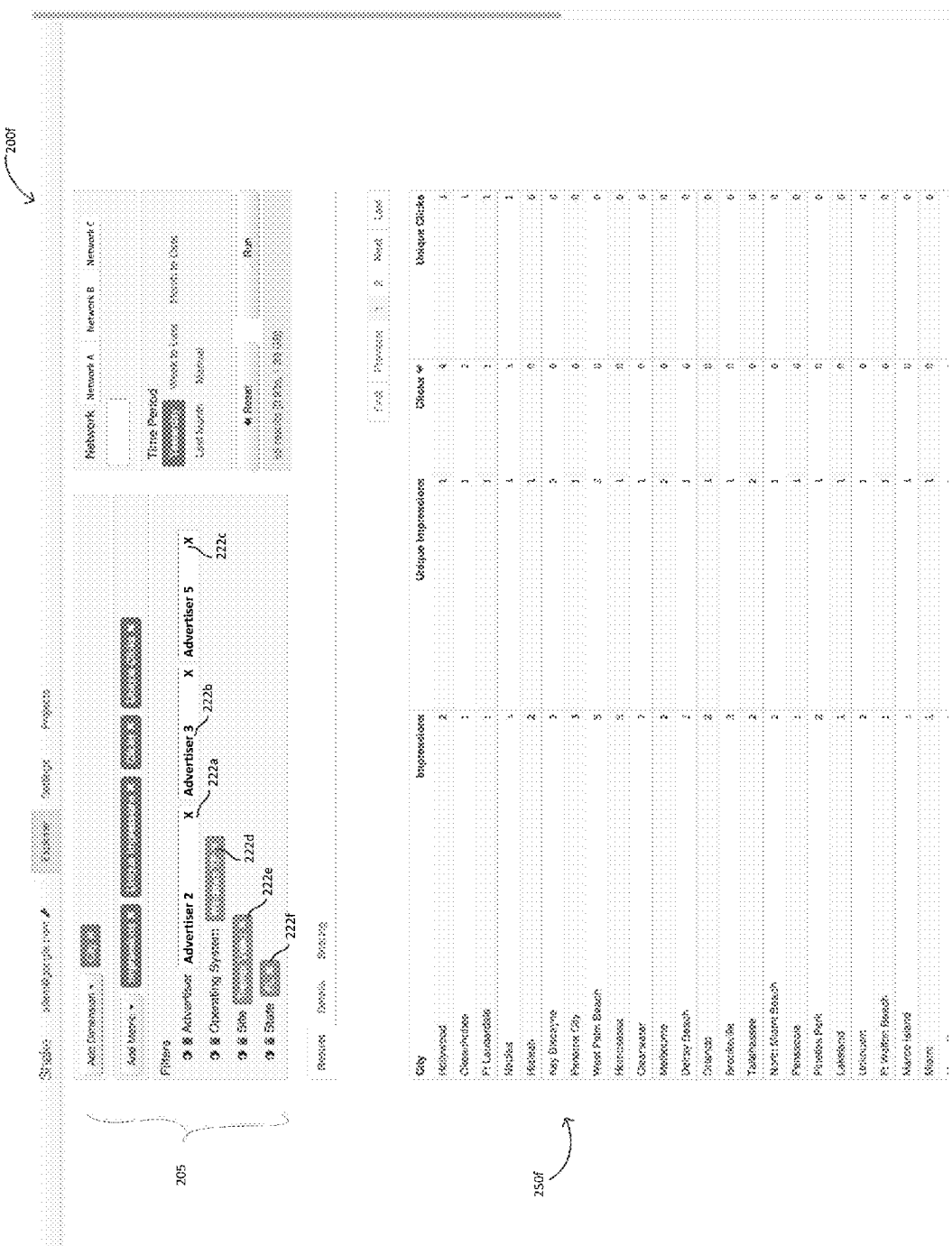

Referring now briefly to FIG. 2G, a screenshot of the user interface 200g includes a pivot table 250f in which each of the rows of the pivot table correspond to a different city in the state of Florida. The user interface 200g also includes the pivot table parameters 205 used to generate the pivot table 250f.

Figure 2H:
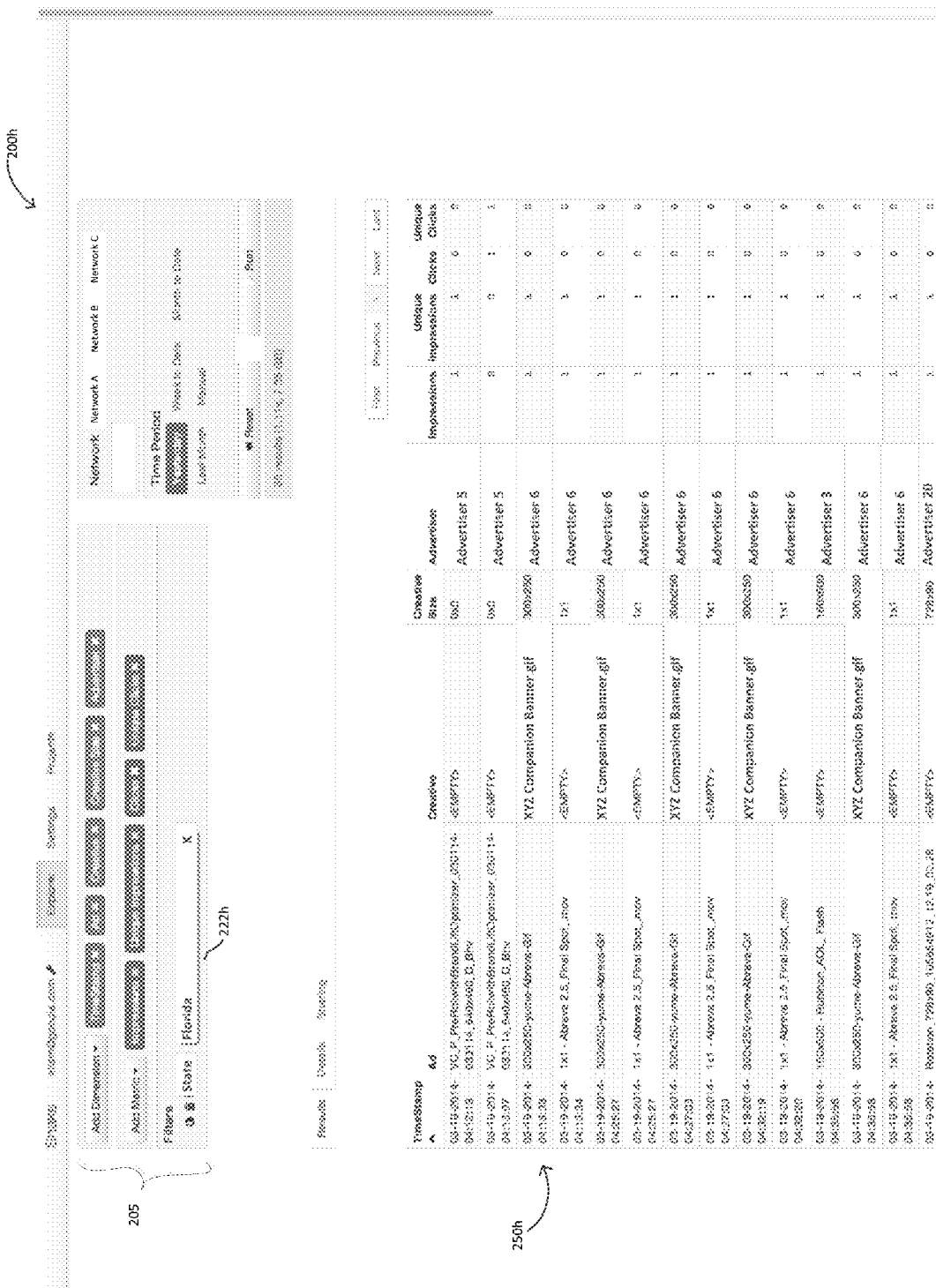

Referring now briefly to FIG. 2H, a screenshot of the user interface 200h includes a pivot table 250g and the pivot table parameters 205 used to generate the pivot table 250g. The pivot table parameters 205 shown in FIG. 2H include different dimensions and metrics, resulting in the pivot table 250g including values corresponding to the metrics associated with the pivot table parameters shown in FIG. 2H.

Referring now briefly to FIG. 2H, a screenshot of the user interface 200h includes a pivot table 250h and the pivot table parameters 205 used to generate the pivot table 250h. The pivot table parameters shown in FIG. 2H no longer include the filters corresponding to Advertisers, Operating System, and City. In some implementations, the pivot table generation module 120 can be configured to remove filters responsive to receiving a user action on an actionable object associated with the filter. In some implementations, if a user clicks on the X shown in the filter objects 222, the filter is removed. If the user subsequently clicks on the Run object, the pivot table generation module 120 can generate a new pivot table that now includes additional entries that previously were filtered out due to the filter that was previously included in the pivot table parameters. The pivot table 250h includes results corresponding to entries in the State of Florida.

The pivot table generation module 120 can be configured to recursively generate pivot tables without having to redefine all of the pivot table parameters. Rather, the pivot table generation module 120 can be configured to recursively generate pivot tables by providing a user interface through which a user can easily select a new dimension based on which to generate a new pivot table. The ability to easily create pivot tables based on any dimension while applying filters based on results included in previously generated pivot tables can allow users with limited technical skills to analyze large data sets.

Figure 2I:
Figure 3A:
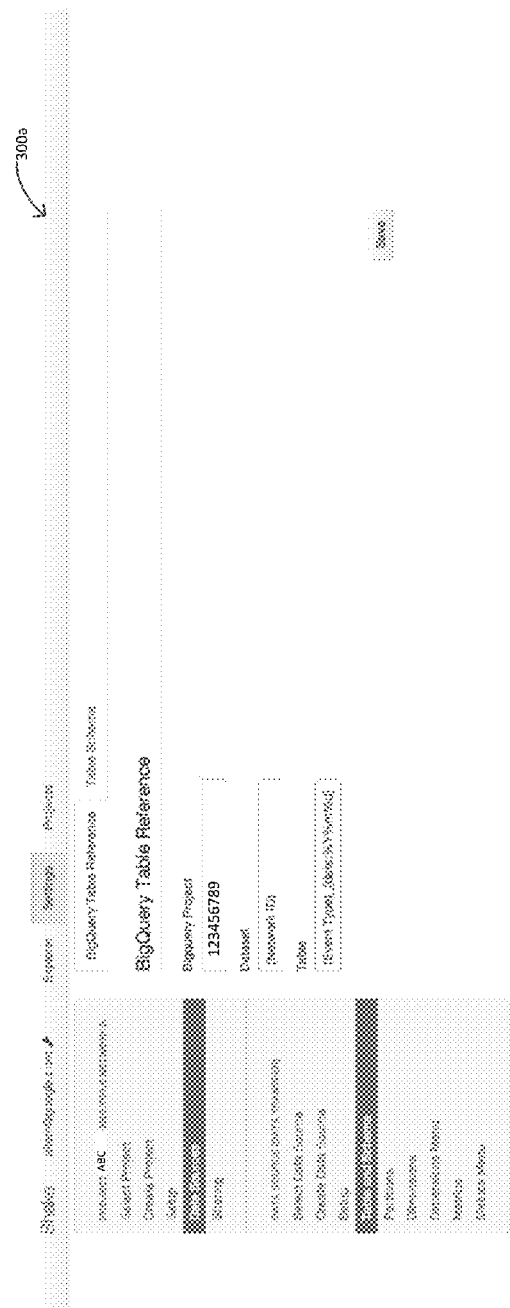
FIGS. 3A-3H are screenshots of various aspects of one implementation of a user interface through which a user can modify settings.
Figure 3B:
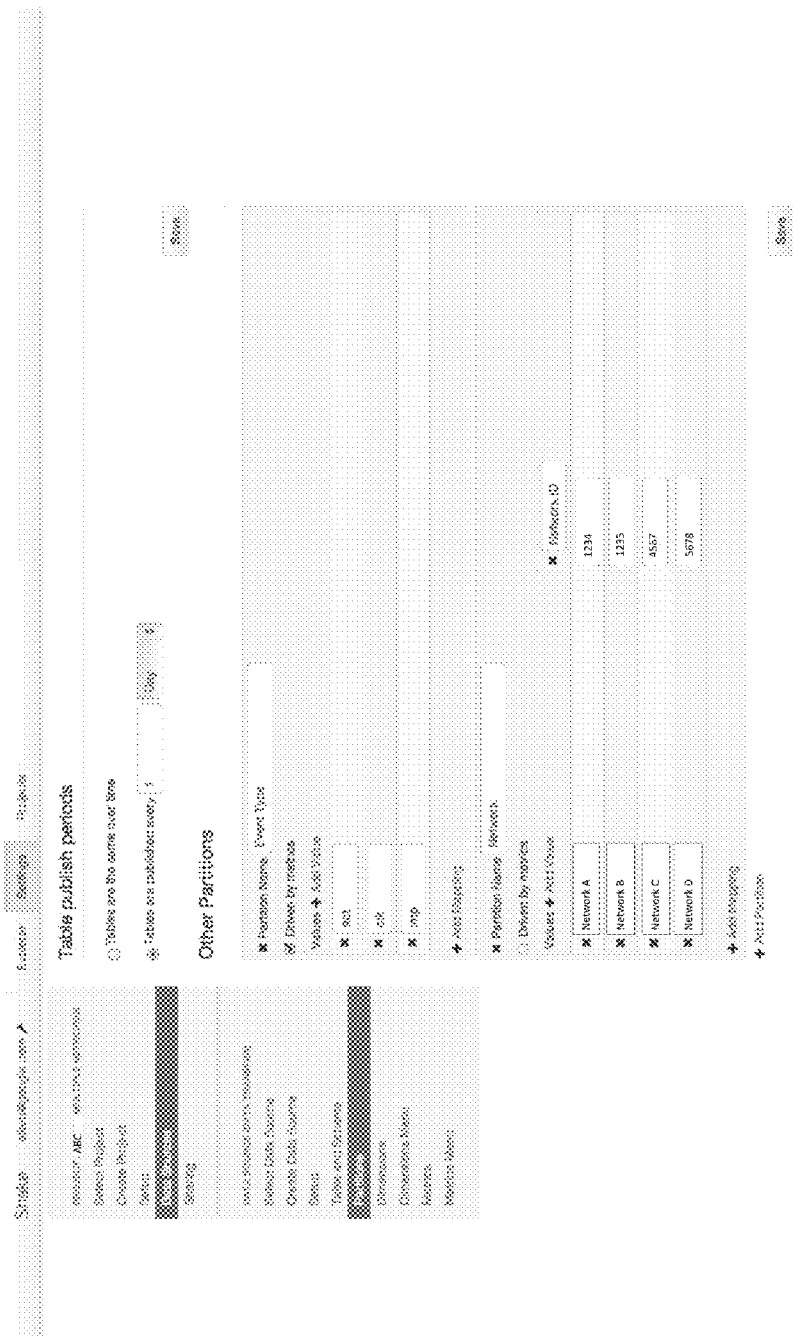
Figure 3C:
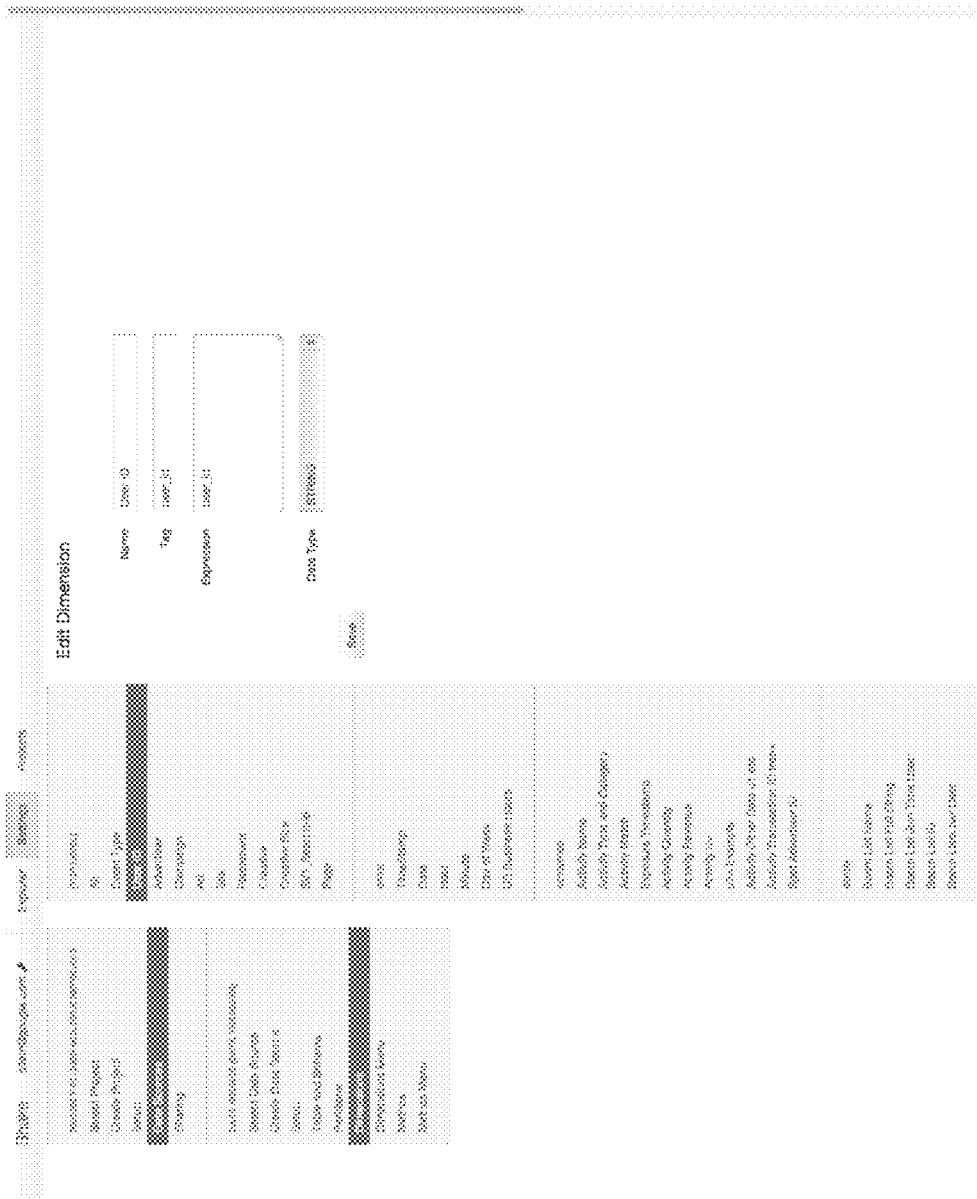
Figure 3D:
Figure 3E:
Figure 3F:
Figure 3G:
Figure 3H:
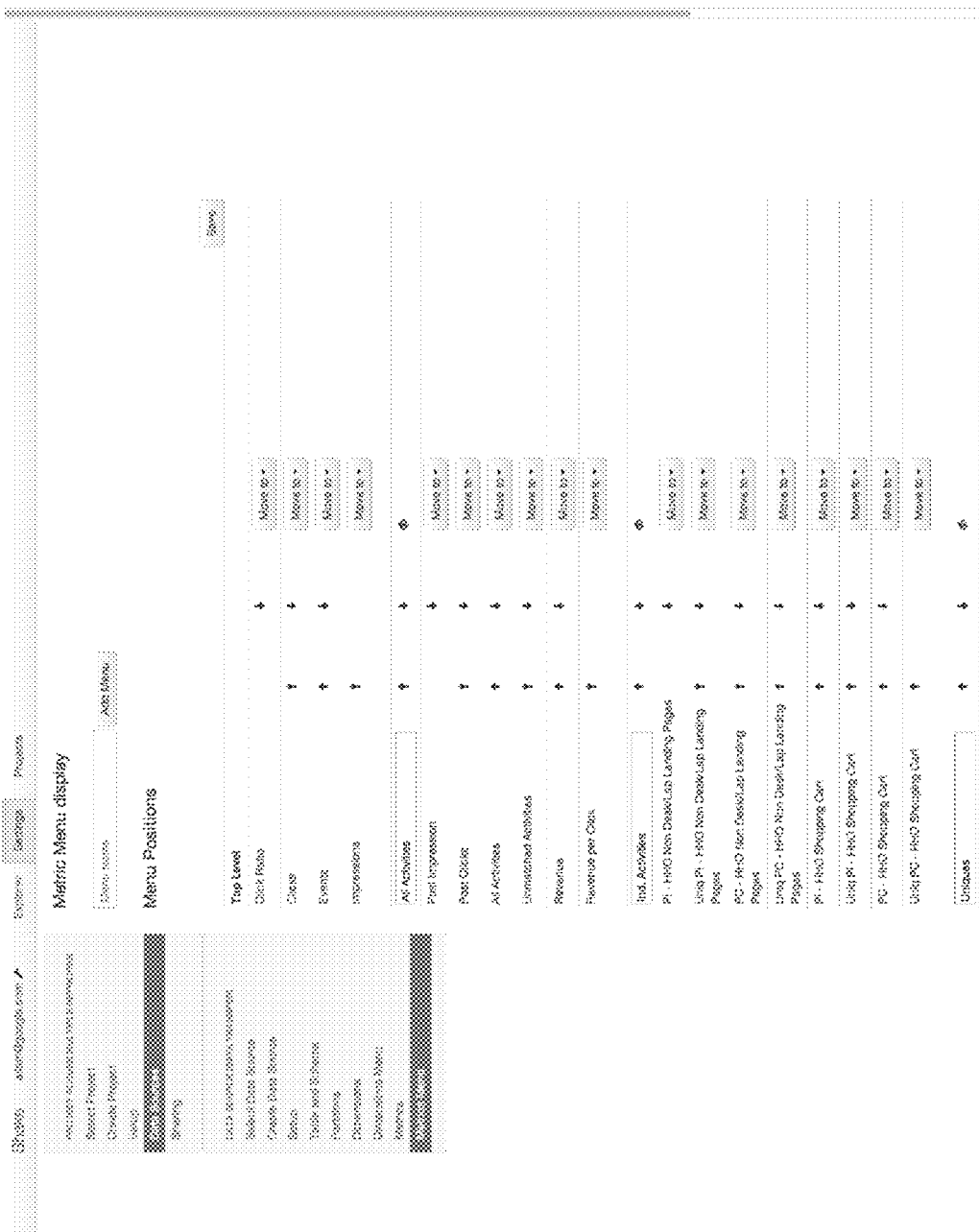

FIG. 2I shows a screenshot of the user interface 200I that includes a portion of the SQL query that is generated by the pivot table generation module 120 based on the pivot table parameters 205 shown in FIG. 2I.

In some implementations, the pivot table generation module can generate an SQL instruction responsive to receiving a request to generate the first table. The data processing system can also modify the generated SQL instruction to include a filter instruction corresponding to the value of the first dimension in response to an action on the actionable object. In some implementations, the data processing system can provide the modified generated SQL instruction for display.

FIGS. 3A-3H are screenshots of a settings user interface through which a user can modify settings. As shown in FIGS. 3A-3H, the pivot table generation module 120 can be configured to allow, via the settings user interface, a user to modify one or more settings. As shown in FIGS. 3A-3H, data sets can be partitioned, joined, or otherwise modified. Dimensions and metrics can be added, removed, or edited. In addition, the format of various dimensions or metrics can be edited.

Figure 4:
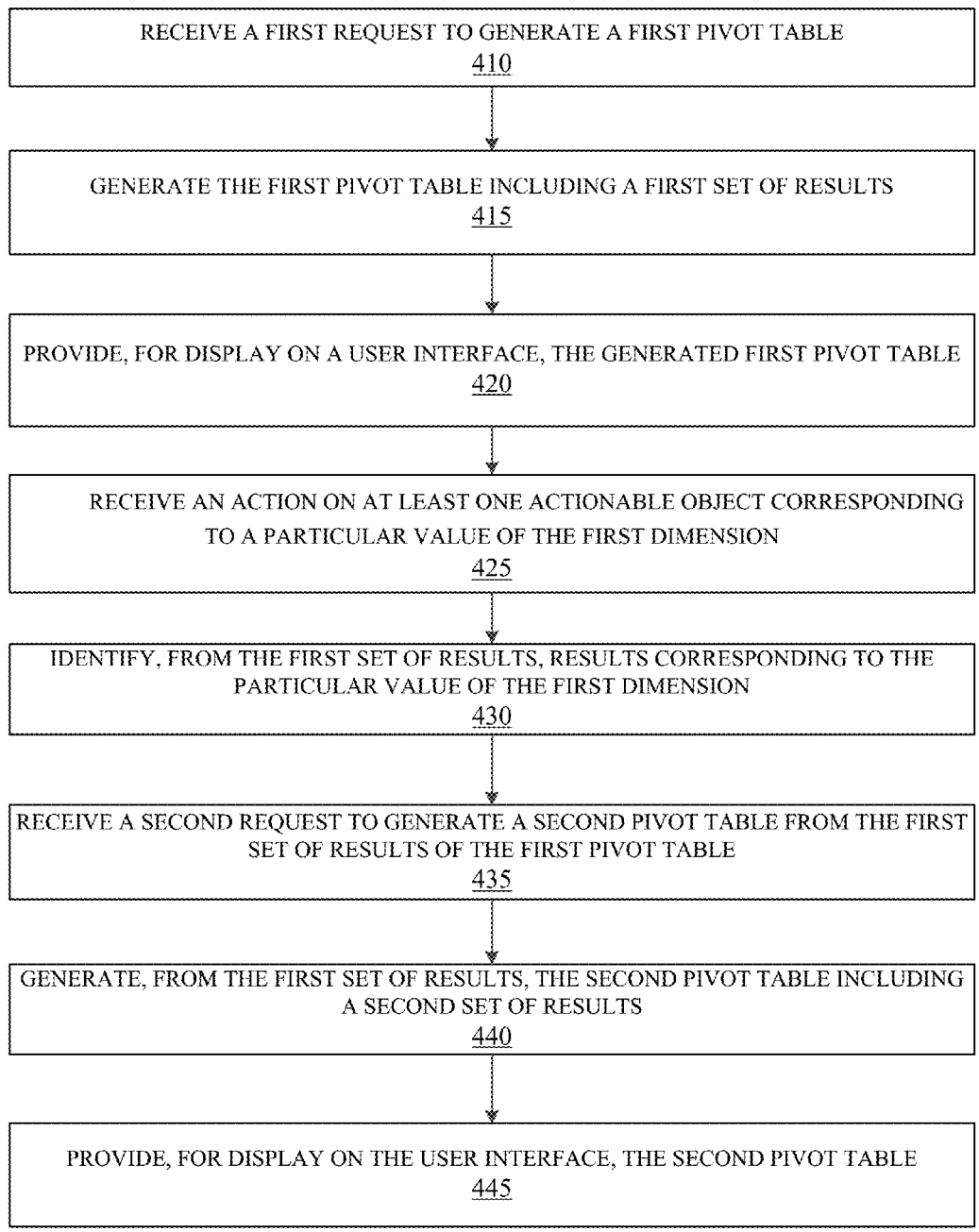
FIG. 4 is a flow diagram depicting one implementation of the steps taken to recursively generating pivot tables.

FIG. 4 is a flow diagram depicting one implementation of the steps taken to recursively generating pivot tables. In particular, FIG. 4 illustrates a flow diagram depicting a method 400 for recursively generating pivot tables. In brief overview, a processor receives a request to generate a first pivot table from a data set including a plurality of entries corresponding to a plurality of dimensions and a plurality of metrics. The request can identify a first dimension of the plurality of dimensions and at least one metric of the plurality of metrics. (BLOCK 410). The request identifies a first dimension of the plurality of dimensions and at least one metric of the plurality of metrics. The processor generates the first table including a first set of results (BLOCK 415). Each result of the first set of results can include a first plurality of values corresponding to the first dimension and the at least one metric identified in the first request. The processor provides, for display on a user interface, the generated first table (BLOCK 420). Each value of the first dimension can be associated with a corresponding actionable object for further filtering the data set. The processor can receive an action on at least one actionable object corresponding to a particular value of the first dimension (BLOCK 425). The processor can identify, from the first set of results, one or more results corresponding to the particular value of the first dimension (BLOCK 430). The processor can receive a second request to generate a second pivot table from the first set of results of the first pivot table (BLOCK 435). The second request can be received in response to a dimension value of the first dimension being selected. The second request can also identify a second dimension of the plurality of dimensions and at least one metric of the plurality of metrics. The processor generates, from the first set of results, the second pivot table including a second set of results (BLOCK 440). Each result of the second set of results including a second plurality of dimension values corresponding to the second dimension and the at least one metric identified in the second request. The processor provides, for display on the user interface, the second pivot table (BLOCK 445). Each dimension value of the second dimension can be associated with a corresponding actionable object for further filtering the data set.

In further detail, a processor receives a request to generate a first pivot table from a data set including a plurality of entries corresponding to a plurality of dimensions and a plurality of metrics (BLOCK 410). The request can identify a first dimension of the plurality of dimensions and at least one metric of the plurality of metrics. The data set may be stored on a data source that is either local to or remote to the processor. In some implementations, the data set can be stored on the cloud. In some implementations, the data set can be stored locally or within a local network to which the processor is connected. The data set can be a flattened data set. In some implementations, the data set can be formed by joining two or more data sets together. In some implementations, the data set can include a plurality of entries. Each entry can correspond to a plurality of dimensions and a plurality of metrics. In some implementations, each entry can include a value associated with one or more of the dimensions.

The processor can receive the request to generate the first pivot table via a user interface. A user of a user computing device can communicate with the processor via the user interface. In some implementations, the user interface can be deployed to the user computing device as a cloud based service. The request to generate the first pivot table can identify the data set from which to generate the first pivot table. In some implementations, the request can include one pivot table parameters to generate the pivot table. The pivot table parameters can include at least one dimension. In some implementations, the pivot table parameters can include at least one dimension and at least one metric. In some implementations, the pivot table parameters can also include at least one filter corresponding to one or more dimension values. In some implementations, the at least one filter can be based on a previously generated pivot table. In some implementations, the pivot table parameters can be selected via the user interface. The parameters can be selected from a list of predefined dimensions and metrics.

The processor can generate the first pivot table including a first set of results (BLOCK 415). Each result of the first set of results can include a first plurality of values corresponding to the first dimension and the at least one metric identified in the request to generate the first pivot table. The processor can generate the first pivot table by generating a database query corresponding to the request to generate the first pivot table. The database query can be an SQL query. In some implementations, the processor can be configured to convert the pivot table parameters associated with the pivot table request to a database query. The processor can then execute the database query to generate the pivot table.

The processor can provide, for display on a user interface, the generated first pivot table (BLOCK 420). The pivot table includes a plurality of columns and rows. The columns correspond to the dimensions and metrics selected as pivot table parameters for generating the pivot table. Each row corresponds to a different dimension value. As such, the number of rows is based on the number of different dimension values included in the data set used to generate the pivot table. The intersection of each row and column is referred to as a cell. In some implementations, the pivot table can include a first plurality of cells. The first plurality of cells can include values of a dimension used to generate the pivot table. In some implementations, the pivot table can also include a second plurality of cells including values of the at least one metric that is used to generate the pivot table. The value of each of the cells in the dimensions columns corresponds to the different dimension values. The value of each of the cells in the metrics columns corresponds to values computed based on the entries corresponding to each of the dimension values. In some implementations, a value for a cell of a metrics column can be based on an aggregate of the entries corresponding to the dimension value with which the metrics cell is associated.

The processor can associate an actionable object with each dimension value of the generated pivot table. The actionable object can be configured to add the dimension value with which the actionable object is associated as a filter for further filtering the data set or for generating a second pivot table. One or more of the actionable objects can be represented as a graphical icon, a link embedded within a cell of a dimensions column, or any other actionable object upon which an action can be taken. Examples of actions that can be taken include a click, a tap, a hover over, or any other action that can cause the actionable object to send a signal to the processor that the actionable object has been actuated.

The processor can receive an action on at least one actionable object corresponding to a particular value of the first dimension (BLOCK 425). In some implementations, the processor can receive an action on at least one actionable object corresponding to a particular value of the first dimension responsive to an action taken by a user on the user interface on which the actionable object is provided for display. In some implementations, the action can be a click, hover over, tap, or any other action that can cause the actionable object to send a signal to the processor that the actionable object has been actuated. In some implementations, responsive to the user taking an action on the actionable object, the processor can receive a signal indicating that an action has been taken on the actionable object. In some implementations, the signal can identify the actionable object on which the action is taken and can select the dimension value associated with the actionable object as a filter.

The processor can identify, from the first set of results, one or more results corresponding to the particular value of the first dimension associated with the actionable object on which the action was taken (BLOCK 430). In some implementations, the processor can identify, from the first set of results, one or more results corresponding to the particular value of the first dimension. In some implementations, if one or more of the other filters previously used to generate the pivot table are removed, the processor can identify additional results that correspond to the particular value of the first dimension and to dimension values previously filtered out by the filters that have been removed. In some implementations, the processor can modify the SQL query to incorporate the addition or removal of filters. In some implementations, the processor can automatically modify the SQL query to remove a limitation from the SQL query in response to removing a filter from the pivot table parameters. Conversely, the processor can automatically modify the SQL query to add a limitation to the SQL query in response to adding a filter to the pivot table parameters. In some implementations, the processor can be configured to generate SQL queries based on the pivot table parameters. As the pivot table parameters are modified, the processor can modify the SQL query to reflect the changes in the pivot table parameters.

The processor can receive a second request to generate a second pivot table from the first set of results of the first pivot table (BLOCK 435). The second request can be received in response to a dimension value of the first dimension being selected. In some implementations, the dimension value of the first dimension can be selected by taking an action on an actionable object corresponding to the dimension value. The dimension value can be added as a filter in response to the actionable object being actuated. In some implementations, other ways of adding the dimension value as a filter may be implemented.

The second request can also identify a second dimension of the plurality of dimensions and at least one metric of the plurality of metrics. In some implementations, a user can, via the user interface, select the second dimension and at least one metric, to use as pivot table parameters to generate the second pivot table. In some implementations, one or more of the second dimension and the at least one metric may previously have been used to generate the first pivot table. The second dimension can be selected from a list of dimensions corresponding to the data set. In some implementations, the second request can include a plurality of dimensions.

The processor can generate, from the first set of results, the second pivot table including a second set of results (BLOCK 440). The second pivot table is generated in response to the second request to generate the second pivot table. In some implementations, the processor may modify the database query used to generate the first pivot table to include one or more instructions corresponding to pivot table parameters included in the request to generate the second pivot table. In some implementations, the processor may provide, for display, the modified database query for display. In some implementations, the modified database query can be copied, modified, or used by the user to generate additional database queries.

The processor provides, for display on the user interface, the second pivot table (BLOCK 445). The second pivot table, like the first pivot table, can include a plurality of columns and rows. Each column corresponds to the dimensions and metrics included in the second request to generate the second pivot table. Each row can correspond to a different dimension value. In some implementations, the processor can associate each dimension value of the dimensions included in the second pivot table with a corresponding actionable object for further filtering the data set. In some implementations, the processor can recursively generate pivot tables from the existing pivot tables.

In some implementations, the processor may modify the database query used to generate the first pivot table to include one or more instructions corresponding to pivot table parameters included in the request to generate the second pivot table. In some implementations, the processor may provide, for display, the modified database query for display. In some implementations, the modified database query can be copied, modified, or used by the user to generate additional database queries.

Figure 5:
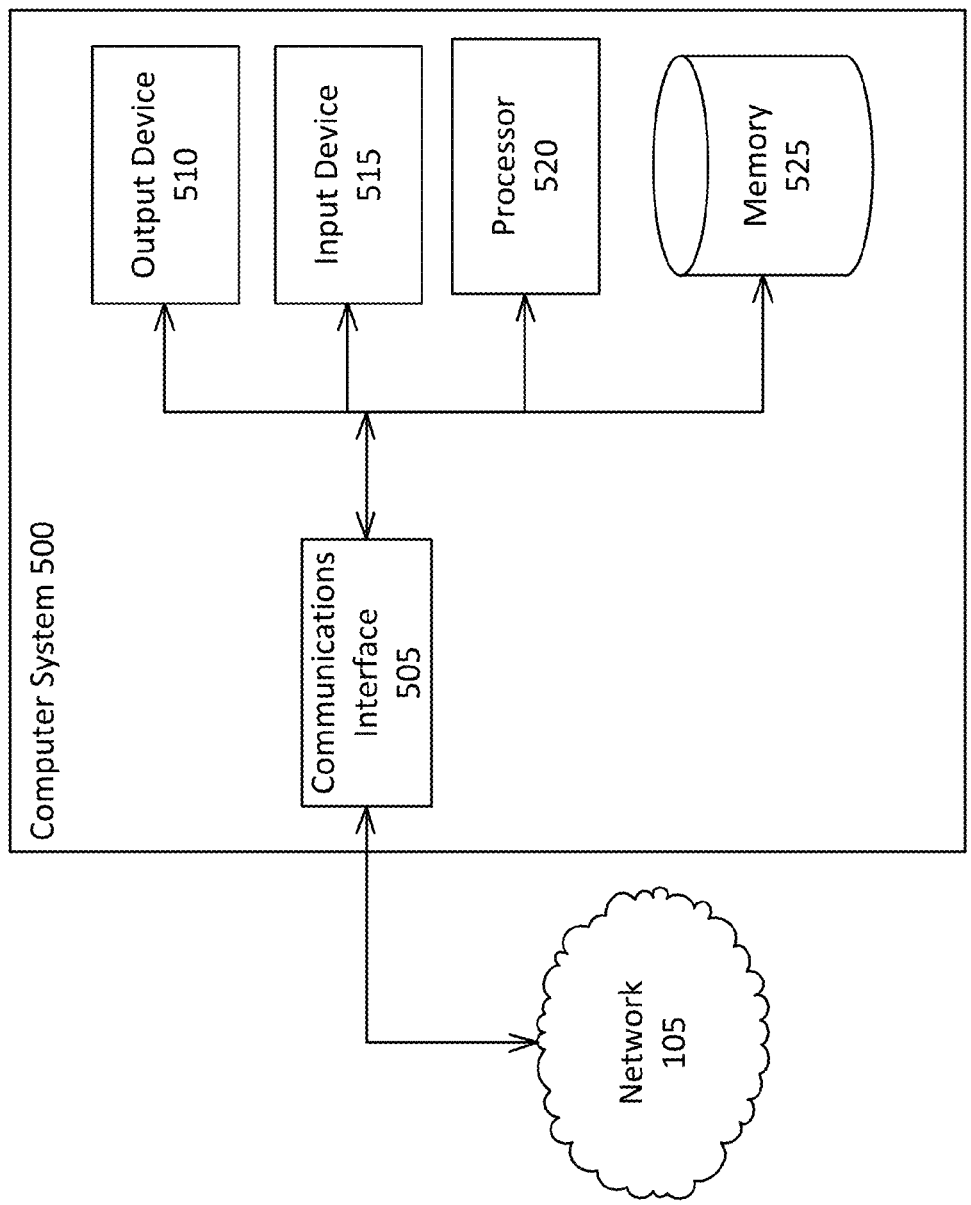
FIG. 5 is a block diagram illustrating an implementation of a general architecture for a computer system that may be employed to implement various elements of the systems and methods described and illustrated herein.

FIG. 5 shows the general architecture of an illustrative computer system 500 that may be employed to implement any of the computer systems discussed herein (including the system 100 and its components such as the pivot table generation module 120) in accordance with some implementations. The computer system 500 can be used to provide information via the network 105 for display. The computer system 500 of FIG. 5 comprises one or more processors 520 communicatively coupled to memory 525, one or more communications interfaces 505, and one or more output devices 510 (e.g., one or more display units) and one or more input devices 515. The processors 520 can be included in the data processing system 110 or the other components of the system 100 such as the pivot table generation module 120.

In the computer system 500 of FIG. 5, the memory 525 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 100 of FIG. 1, the data processing system 110 can include the memory 525 to store data sets, pivot table related information, amongst others. The memory 525 can include the database 140. The processor(s) 520 shown in FIG. 5 may be used to execute instructions stored in the memory 525 and, in so doing, also may read from or write to the memory various information processed and or generated pursuant to execution of the instructions.

The processor 520 of the computer system 500 shown in FIG. 5 also may be communicatively coupled to or control the communications interface(s) 505 to transmit or receive various information pursuant to execution of instructions. For example, the communications interface(s) 505 may be coupled to a wired or wireless network, bus, or other communication means and may therefore allow the computer system 500 to transmit information to or receive information from other devices (e.g., other computer systems). While not shown explicitly in the system of FIG. 1, one or more communications interfaces facilitate information flow between the components of the system 100. In some implementations, the communications interface(s) may be configured (e.g., via various hardware components or software components) to provide a website as an access portal to at least some aspects of the computer system 500. Examples of communications interfaces 505 include user interfaces (e.g., web pages), through which the user can communicate with the data processing system 110.

The output devices 510 of the computer system 500 shown in FIG. 5 may be provided, for example, to allow various information to be viewed or otherwise perceived in connection with execution of the instructions. The input device(s) 515 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The pivot table generation module 120 can include or share one or more data processing apparatus, computing devices, or processors.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 500 or system 100 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the pivot table generation module 120 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to generating pivot tables based on advertising data, the systems and methods described herein can be applied to any program in any vertical in which pivot tables can be utilized, including but not limited to advertising, or any other sector in which large sets of data may be analyzed. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method for recursively generating pivot tables, comprising
    receiving, by a processor, a first request to generate a first pivot table from a data set including a plurality of entries corresponding to a plurality of dimensions and a plurality of metrics, the first request identifying a first dimension of the plurality of dimensions and at least one metric of the plurality of metrics;
    generating the first pivot table including a first set of results, each result of the first set of results including a first plurality of values corresponding to the first dimension and the at least one metric identified in the first request;
    providing, for display on a user interface, the generated first pivot table, each value of the first dimension associated with a corresponding actionable object for further filtering the data set;
    receiving an action on at least one actionable object corresponding to a particular value of the first dimension;
    identifying, from the first set of results, one or more results corresponding to the particular value of the first dimension;
    receiving a second request to generate a second pivot table from the results corresponding to the particular value of the first dimension, the second request identifying a second dimension of the plurality of dimensions and at least one metric of the plurality of metrics;
    generating, from the identified results corresponding to the particular value of the first dimension, the second pivot table including a second set of results, each result of the second set of results including a second plurality of dimension values corresponding to the second dimension and the at least one metric identified in the second request; and
    providing, for display on the user interface, the second pivot table, each dimension value of the second dimension associated with a corresponding actionable object for further filtering the data set.

2. The method of claim 1, further comprising:
    generating a database query responsive to receiving the first request to generate the first pivot table; and
    responsive to receiving the second request, modifying the generated database query to include a filter instruction corresponding to the dimension value of the first dimension.

3. The method of claim 2, further comprising providing, for display, the modified generated database query.

4. The method of claim 1, further comprising providing, for display on the user interface, the dimension value of the first dimension as an actionable object.

5. The method of claim 1, further comprising responsive to an action on an actionable object corresponding to a value of the first dimension, generating a filter identifying a first set of entries of the plurality of entries that correspond to a value of the first dimension with which the actionable object is associated.

6. The method of claim 1, further comprising providing, for display, the first pivot table including a first plurality of cells including values of the first dimension and a second plurality of cells including values of the at least one metric.

7. The method of claim 6, wherein the first plurality of cells include the actionable objects.

8. A system for recursively generating pivot tables, comprising:
a data processing system having a pivot table generation module and a user interface module, the data processing system further comprising
a memory storing processor-executable instructions; and
a processor configured to execute the processor-executable instructions to:
receive a first request to generate a first pivot table from a data set including a plurality of entries corresponding to a plurality of dimensions and a plurality of metrics, the request identifying a first dimension of the plurality of dimensions and at least one metric of the plurality of metrics;
generate the first pivot table including a first set of results, each result of the first set of results including a first plurality of values corresponding to the first dimension and the at least one metric identified in the first request;
provide, for display on a user interface, the generated first pivot table, each value of the first dimension associated with a corresponding actionable object for further filtering the data set;
receive an action on at least one actionable object corresponding to a particular value of the first dimension;
identify, from the first set of results, one or more results corresponding to the particular value of the first dimension;
receive a second request to generate a second pivot table from the results corresponding to the particular value of the first dimension, the second request identifying a second dimension of the plurality of dimensions and at least one metric of the plurality of metrics;
generate, from the identified results corresponding to the particular value of the first dimension, the second pivot table including a second set of results, each result of the second set of results including a second plurality of dimension values corresponding to the second dimension and the at least one metric identified in the second request; and
provide, for display on the user interface, the second pivot table, each dimension value of the second dimension associated with a corresponding actionable object for further filtering the data set.

9. The system of claim 8, wherein the processor is further configured to:
generate a database query responsive to receiving the first request to generate the first pivot table; and
responsive to receiving the second request, modify the generated database query to include a filter instruction corresponding to the dimension value of the first dimension.

10. The system of claim 9, wherein the processor is further configured to provide, for display, the modified generated database query.

11. The system of claim 8, wherein the processor is further configured to provide, for display on the user interface, the dimension value of the first dimension as an actionable object.

12. The system of claim 8, further comprising responsive to an action on an actionable object corresponding to a value of the first dimension, generate a filter identifying a first set of entries of the plurality of entries that correspond to a value of the first dimension with which the actionable object is associated.

13. The system of claim 8, wherein the processor is further configured to provide, for display, the first pivot table including a first plurality of cells including values of the first dimension and a second plurality of cells including values of the at least one metric.

14. The system of claim 13, wherein the first plurality of cells include the actionable objects.

15. A computer-readable storage medium having instructions to provide information via a computer network, the instructions comprising instructions to:
receive a first request to generate a first pivot table from a data set including a plurality of entries corresponding to a plurality of dimensions and a plurality of metrics, the request identifying a first dimension of the plurality of dimensions and at least one metric of the plurality of metrics;
generate the first pivot table including a first set of results, each result of the first set of results including a first plurality of values corresponding to the first dimension and the at least one metric identified in the first request;
provide, for display on a user interface, the generated first pivot table, each value of the first dimension associated with a corresponding actionable object for further filtering the data set;
receive an action on at least one actionable object corresponding to a particular value of the first dimension;
identify, from the first set of results, one or more results corresponding to the particular value of the first dimension;
receive a second request to generate a second pivot table from the results corresponding to the particular value of the first dimension, the second request identifying a second dimension of the plurality of dimensions and at least one metric of the plurality of metrics;
generate, from the identified results corresponding to the particular value of the first dimension, the second pivot table including a second set of results, each result of the second set of results including a second plurality of dimension values corresponding to the second dimension and the at least one metric identified in the second request; and
provide, for display on the user interface, the second pivot table, each dimension value of the second dimension associated with a corresponding actionable object for further filtering the data set.

16. The computer-readable storage medium of claim 15, wherein the instructions include instructions to:
generate a database query responsive to receiving the first request to generate the first pivot table; and
responsive to receiving the second request, modify the generated database query to include a filter instruction corresponding to the dimension value of the first dimension.

17. The computer-readable storage medium of claim 16, wherein the instructions include instructions to provide, for display, the modified generated database query.

18. The computer-readable storage medium of claim 15, wherein the instructions include instructions to provide, for display on the user interface, the dimension value of the first dimension as an actionable object.

19. The computer-readable storage medium of claim 15, wherein the instructions include instructions to responsive to an action on an actionable object corresponding to a value of the first dimension, generate a filter identifying a first set of entries of the plurality of entries that correspond to a value of the first dimension with which the actionable object is associated.

20. The computer-readable storage medium of claim 15, wherein the instructions include instructions to provide, for display, the first pivot table including a first plurality of cells including values of the first dimension and a second plurality of cells including values of the at least one metric.

\* \* \* \* \*